United States Patent [19]
Lee

[11] Patent Number: 6,039,777
[45] Date of Patent: Mar. 21, 2000

[54] AIR FILTER DEVICE AND AN AUTOMOBILE HAVING THE SAME

[75] Inventor: Jeong-Ki Lee, Incheon, Rep. of Korea

[73] Assignee: Daewoo Motor Co, Ltd., Seoul, Rep. of Korea

[21] Appl. No.: 09/091,959

[22] PCT Filed: Dec. 26, 1996

[86] PCT No.: PCT/KR96/00247

§ 371 Date: Jun. 19, 1998

§ 102(e) Date: Jun. 19, 1998

[87] PCT Pub. No.: WO97/23360

PCT Pub. Date: Jul. 3, 1997

[30] Foreign Application Priority Data

Dec. 26, 1995 [KR] Rep. of Korea ............... 95-56097

[51] Int. Cl.[7] .................................................. B01D 46/10
[52] U.S. Cl. ........................ 55/385.3; 55/481; 55/497; 55/511; 55/521; 55/DIG. 31
[58] Field of Search ................... 55/385.3, 481, 55/497, 511, 521, DIG. 31; 123/198 E

[56] References Cited

U.S. PATENT DOCUMENTS

| | | | |
|---|---|---|---|
| 5,147,430 | 9/1992 | Kidd | 55/385.3 |
| 5,360,463 | 11/1994 | Dietterle et al. | 55/511 |
| 5,494,497 | 2/1996 | Lee | 55/385.3 |
| 5,501,716 | 3/1996 | Chiba et al. | 55/385.3 |
| 5,613,991 | 3/1997 | Ejaki et al. | 55/385.3 |

FOREIGN PATENT DOCUMENTS

| | | |
|---|---|---|
| 404367703 | 12/1992 | Japan. |
| 405103931 | 4/1993 | Japan. |
| 406226024 | 8/1994 | Japan. |

*Primary Examiner*—David A. Simmons
*Assistant Examiner*—Minh-Chau T. Pham
*Attorney, Agent, or Firm*—McDonnell, Boehnen, Hulbert & Berghoff

[57] ABSTRACT

An air filter device and an automobile having the same includes an air filter bent without disassembling a cowl to be simply and easily replaced within a narrow space, and the air filter is commonly utilized to both left-handed drive type and right-handed drive type automobiles. For this, an air filter member is formed with a creasing part throughout the overall portion thereof. A pair of frame members support the marginal edge of the air filter member, and a connecting frame member is integrally connected to the ends of the first frame member and second frame member to allow for bidirectional bending of the air filter member. Thus, the air filter is simply replaced without causing an interference with a frame mounted with a shock absorber. Also, the second frame member is upwardly bent at any time even though the up and down portions are reversed to have compatibility capable of being commonly employed into the left-handed drive type automobile and right-handed drive type automobile.

7 Claims, 7 Drawing Sheets

AIR FILTER DEVICE AND AN AUTOMOBILE HAVING THE SAME

TECHNICAL FIELD

The present invention relates to an air filter device employed for an air regulating system of an automobile, and more particularly to an air filter device installed to be compatible to both air regulating systems of right-handed drive type vehicle and left-handed drive type vehicle, and an automobile having the same.

BACKGROUND ART

In order to maintain the favorable condition within the interior of an automobile, an air regulating system thereof generally serves for taking in external air and supplying the air into the interior of the automobile by performing thermal exchange after foreign matters such as dust are eliminated.

Referring to FIGS. 1 and 2, the conceptual structure and operation of an air filter device of the conventional air regulating system for automobile will be described hereinbelow.

FIG. 1 is a sectional view schematically showing a state that an air filter is installed to the interior of the conventional air regulating system for automobile. As shown in FIG. 1, the air regulating system is largely classified into an inlet duct 3, a supply duct 9 and a connecting duct 5 for mutually connecting these.

Inlet duct 3 is installed with a blower motor (not shown) therein and an inlet 1 for admitting the air in one side thereof. Supply duct 9 is internally furnished with a heater (not shown) and an evaporator (not shown). Connecting duct 5 is installed between inlet duct 3 and supply duct 9, and an air filter 7 for eliminating dust and the like is installed within connecting duct 5.

The dust and the like in the air introduced into inlet duct 3 via inlet 1 are eliminated while passing through air filter 7 of connecting duct 5. Thereafter, the resultant air is heated or cooled within supply duct 9 to be supplied to the interior.

FIG. 2 is a sectional view schematically showing a state that the air filter is installed into the interior of a conventional cowl apparatus. As shown in FIG. 2, a cowl 10 for receiving the air is installed to one plane of a dash panel 14. Cowl 10 is installed with an air filter 12 at the entrance side in communicating with an air conditioner module (not shown).

According to the aforementioned construction, foreign matters such as dust in the air introduced via cowl 10 is eliminated while passing through air filter 12, and the resultant air is transferred to the airconditioner module.

In the above description, the conventional air filter device for automobile constructed and operated as above is conceptually explained. Now, the construction and operation of the conventional air filter device for automobile will be described in more detail with reference to FIGS. 3, 4 and 5.

FIG. 3 is a view showing an installation state of representing the installing place of a conventional air regulating system for left-handed drive type automobile. As shown in FIG. 3, an evaporator unit 21 for forcibly admitting to cool external air is installed into the interior of an automobile 20. A blower unit 30 is connectively installed to one side of evaporator unit 21 to supply the air into the every part of the interior.

FIG. 4 illustrates a sectional view of the air regulating system shown in FIG. 3. As shown in FIG. 4, evaporator unit 21 is formed by an impeller 23, an air filter 40 and an evaporator 31. Blower unit 30 is formed by a plurality of gates 22 and an air vent 35.

A gate 22a for adjusting the quantity of introduced air is provided to the entrance side of evaporator unit 21, and impeller 23 connected to a blower motor 25 is installed within a duct 27. Evaporator 31 is installed to a predetermined position within the interior of duct 27 to go across overall cutaway plane, and air filter 40 is sandwiched between evaporator 31 and impeller 23. A heater 33 is installed to the rear side of evaporator 31 when using the flowing direction of the air as a reference.

The interior of blower unit 30 is formed by a duct branched into several parts. Gates 22b and 22c for controlling an opening area are provided to the entrance sides of respective branched ducts, and plurality of air vents 35a, 35b, 35c and 35d extending to every part of the interior of the automobiles are formed to the exit sides.

FIG. 5 shows a perspective view of air filter 40 shown in FIG. 4. As shown in FIG. 5, air filter 40 is largely classified into an air filter member 42, a frame 44 and sponges 43 and 45.

Air filter member 42 is provided such that a plurality of alternately-folded creases are arranged at equal distances. Frame 44 for supporting air filter member 42 is adhered to the edge of air filter member 42. Sponges 43 and 45 are installed to both sides of frame 44 to oppose to each other. Especially, the portion of being installed with sponge 45 is to be asymmetrically-shaped for efficiently utilizing a space within an engine room.

The conventional air regulating system for automobile having the foregoing structure is operated as below.

Impeller 23 rotated by blower motor 25 is forcibly supplied with external air. Accordingly, the external air is forcibly introduced into the interior of duct 27 via gate 22a. The introduced air passes through air filter 40 up and down to be cleaned by eliminating the foreign matters such as dust, and sequentially passes through evaporator 31 and heater 33. At this time, the air is cooled or heated by evaporator 31 or heater 33, which is selectively operated by a driver.

The air having passed through evaporator unit 21 is appropriately distributed in accordance with the opening/closing extent of respective gates 22b and 22c, and then is supplied into the interior of the automobile via air vents 35a, 35b, 35c and 35d.

The conventional air filter device for automobile has been described heretofore. However, the conventional air filter device for automobile illustrated and described with reference to FIGS. 1 to 5 has the following problems.

Due to the short durability, the air filter is an expandable supplies required for being replaced in accordance with the travelling distance (e.g., replacement per 10,000 km of the travelling speed) of the automobile. But the frame mounted with a shock absorber is formed to a frontal portion of the entrance inserted with the air filter device, thereby causing an interference when the air filter device is intended to be replaced.

Consequently, the conventional air regulating system shown in FIGS. 1 and 2 is inconvenient in that a globe box frame and cowl are to be disassembled when replacing the air filters. Furthermore, the driver cannot replace the air filter by himself to thus request for the replacement to a service center that is furnished with an exclusive facility.

Also, automobiles are classified into a left-handed drive type that a handle is installed to the left and a right-handed drive type that the handle is to the right. However, the conventional air filter device is symmetrically manufactured with respect to the left-handed drive type and right-handed drive type automobiles to be incompatible with each other.

DISCLOSURE OF INVENTION

It is an object of the present invention to provide an air filter device and an automobile having the same, wherein, in order to solve the foregoing problems, an air filter is bent to be easily and simply replaced within a narrow space without disassembling a cowl.

It is another object of the present invention to provide an air filter device and an automobile having the same, wherein an air filter is constructed to be bent to both directions for being commonly utilized to a left-handed drive type and right-handed drive type automobiles.

To achieve the above and other objects of the present invention, an air filter device includes an air filter member formed with a creasing part onto at least one portion thereof, and a plurality of frame members which support the marginal edge of the air filter member and commonly contact along the marginal edge of the creasing part of the air filter member. Also, a connecting unit for connecting the frame members allows for bidirectional bending of the air filter member by centering about the creasing part.

Here, the creasing part is provided by creases arranged at equal distances, which may be formed throughout overall portion of the air filter member. The air filter member has an asymmetrical shape with respect to the transversal direction against a bending line of the creasing part.

Preferably, the frame members is provided by a pair, and the frame member is formed with ribs onto at least one outer plane thereof in the length direction. More preferably, the ribs are respectively formed to pair of opposing outer planes of the frame members, and are provided by two pairs. In addition, the frame members further include sponges installed to the outer side planes other than the planes formed with the ribs for closely fixing the frame members.

It is preferable that the connecting unit is a connecting frame member having one end connected to an end portion of the first frame member and the other end connected to an end portion of the second frame member, and the connecting frame member has a corner area of one end connected to the end portion of the first frame member and a diagonal corner area of the other end which is substantially shaped as a rectangular side plane connected to the end portion of the second frame member.

More preferably, the connecting frame member is integrally formed with the first frame member, and is formed with first notches at the connecting portion for facilitating a bending motion. Furthermore, the connecting frame member is integrally formed with the second frame member, and is formed with second notches at the connecting portion for facilitating the bending motion.

Alternatively, an air filter device according to the present invention includes an air filter member which is formed with a creasing part folded at equal distances throughout overall portion thereof and has an asymmetric shape with respect to the transversal direction against a bending line of the creasing part. Additionally, a pair of frame members for supporting the marginal edge of the air filter member commonly contact along the marginal edge of the creasing part of the air filter member, and are formed with ribs at mutually-opposing pair of outer side planes and sponges onto the other pair of outer side planes. A connecting frame member has a corner area of one end connected to an end portion of the first frame member to allow for bidirectional bending of the air filter member by centering about the creasing part, has a diagonal corner area of the other end integrally connected to an end portion of the second frame member to form a substantially rectangular side plane shape, and is formed with notches at respective connecting portions for facilitating a bending motion.

To achieve the above and other objects of the present invention, an automobile includes an air filter device having an air filter member which is formed with a creasing part throughout overall area and has an asymmetric shape with respect to the transversal direction against a bending line of the creasing part, a pair of frame members for supporting the marginal edge of the air filter member, and a connecting frame member for allowing for bidirectional bending of the air filter member by centering about the creasing part. Also, an air regulating system is formed with a filter hole inserted with the air filter device, and holes for taking in external air in a portion adjacent to the filter hole.

Preferably, the filter hole has an entrance corresponding to the transversal section with respect to the direction of receiving the air filter, and the entrance is spaced apart from a shock absorber frame mounted with a shock absorber by a predetermined distance. More preferably, the distance is shorter than the air filter.

It is preferable that the holes are formed in the frontal direction of a driver's seat, and the hole is provided by a pair.

An operation of the air filter device constructed as above and automobile having the same will be described below.

When the air filter device is intended to be installed to a left-handed drive type automobile, the second frame is bent into one direction. By this operation, the bending is incited at the first notches and, at the same time, the angle between the connecting frame and first frame member is widened. Under the above bending state, the first frame member is horizontally inserted into the filter hole. While the first frame member is inserted, the second frame member is returned to the original position to allow respective frames of the air filter to linearly arrange. Then, the second frame member is pushed into the interior of the filter hole. By doing so, the air filter is completely installed.

When the air filter device is intended to be installed to the right-handed drive type automobile, the second frame is bent in the direction opposite to that of the left-handed drive type automobile. By this operation, the bending is incited at the second notches and, at the same time, the angle between the connecting frame and second frame member is widened. Under the above bending state, the first frame member is horizontally inserted into the filter hole. While the first frame member is inserted, the second frame member is returned to the original position to allow respective frames of the air filter to linearly arrange. Then, the second frame member is pushed into the interior of the filter hole. By doing so, the air filter is completely installed.

In association with the air filter device and automobile having the same operated as above, the air filter can be replaced without causing an interference with the frame mounted with a shock absorber while the cowl is not disassembled. Thus, the present invention has an advantage of simplifying the exchanging work of the air filter with the consequence of affording convenience that a driver can individually replace the air filter without requesting it to a service center, etc.

In addition, the air filter device and automobile having the same according to the present invention has a compatibility capable of being commonly employed into both the left-handed drive type automobile and right-handed drive type automobile. For this reason, the air filter can be simplified by a single part. As the result, it is effective in economizing the manufacturing cost of the air filter, enhancing productivity, and the like.

BRIEF DESCRIPTION OF THE DRAWINGS

The above objects and other advantages of the present invention will become more apparent by describing in detail preferred embodiments thereof with reference to the attached drawings in which.

BEST MODE FOR CARRYING OUT THE INVENTION

An air filter device and an automobile having the same according to the present invention will be described in detail with reference to the preferred embodiment shown in FIGS. 6 to 9.

Figure 1:
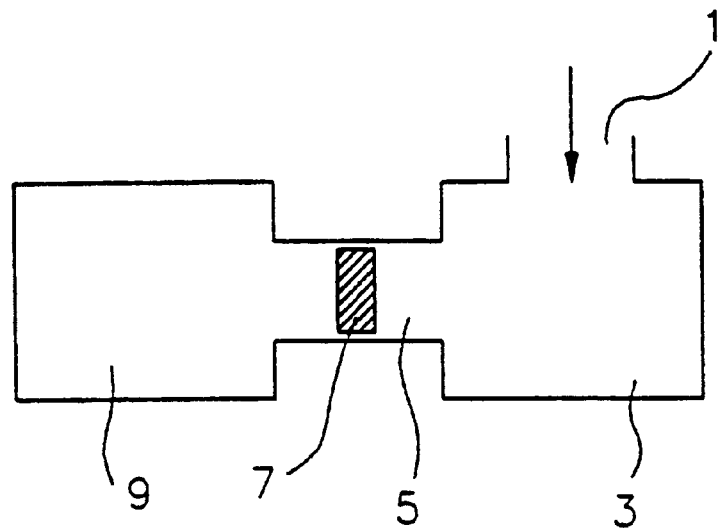
FIG. 1 is a sectional view schematically showing a state that an air filter is installed to the interior of a conventional air regulating system for automobile.
Figure 2:
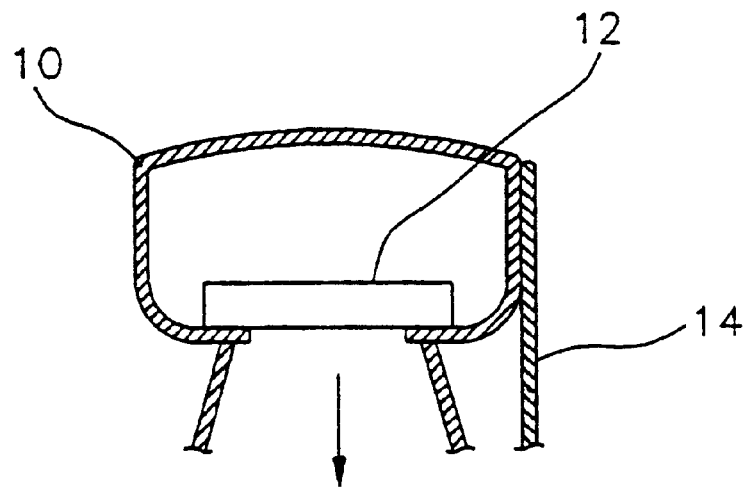
FIG. 2 is a sectional view schematically showing a state that an air filter is installed to an interior of a conventional cowl apparatus.
Figure 3:
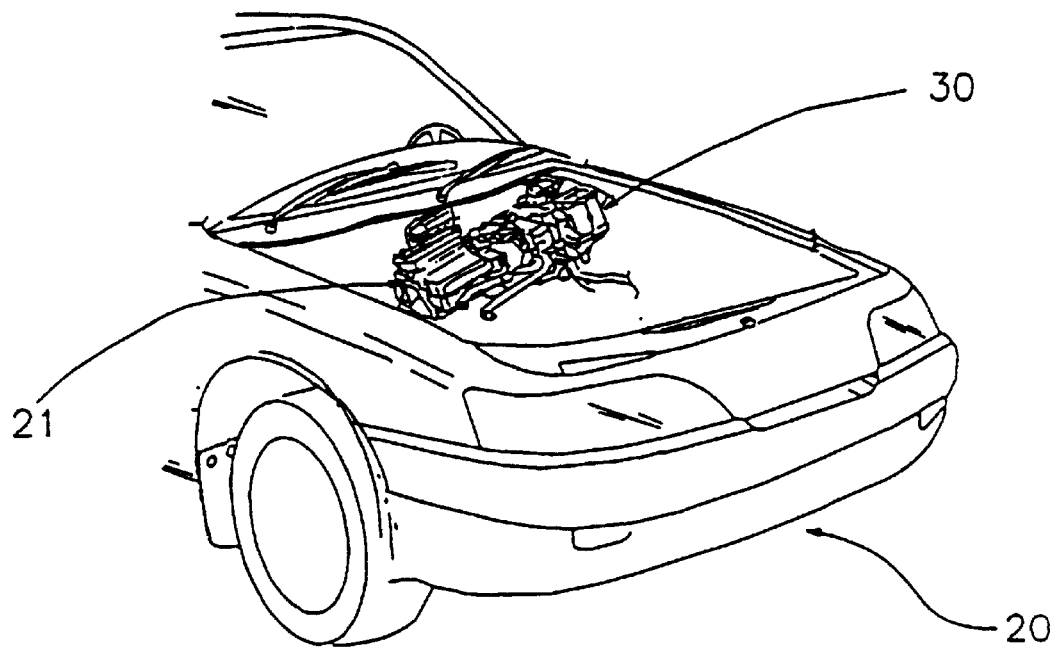
FIG. 3 shows an installing state of representing an installing position of a conventional air regulating system for left-handed drive type automobile.
Figure 4:
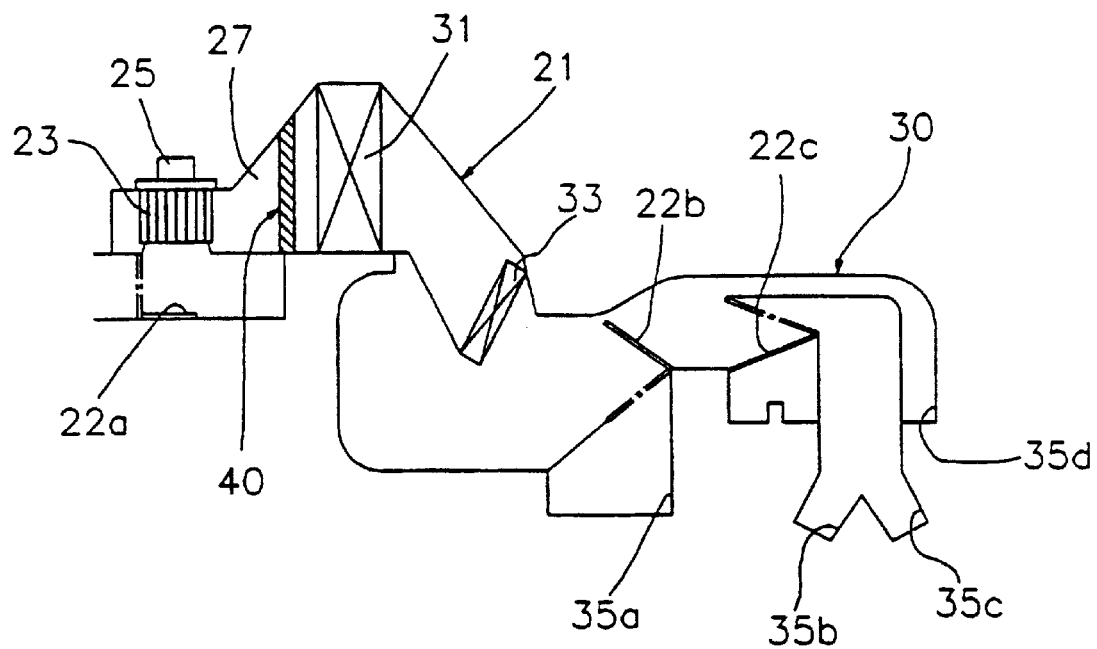
FIG. 4 is a sectional view of the air regulating system shown in FIG. 3.
Figure 5:
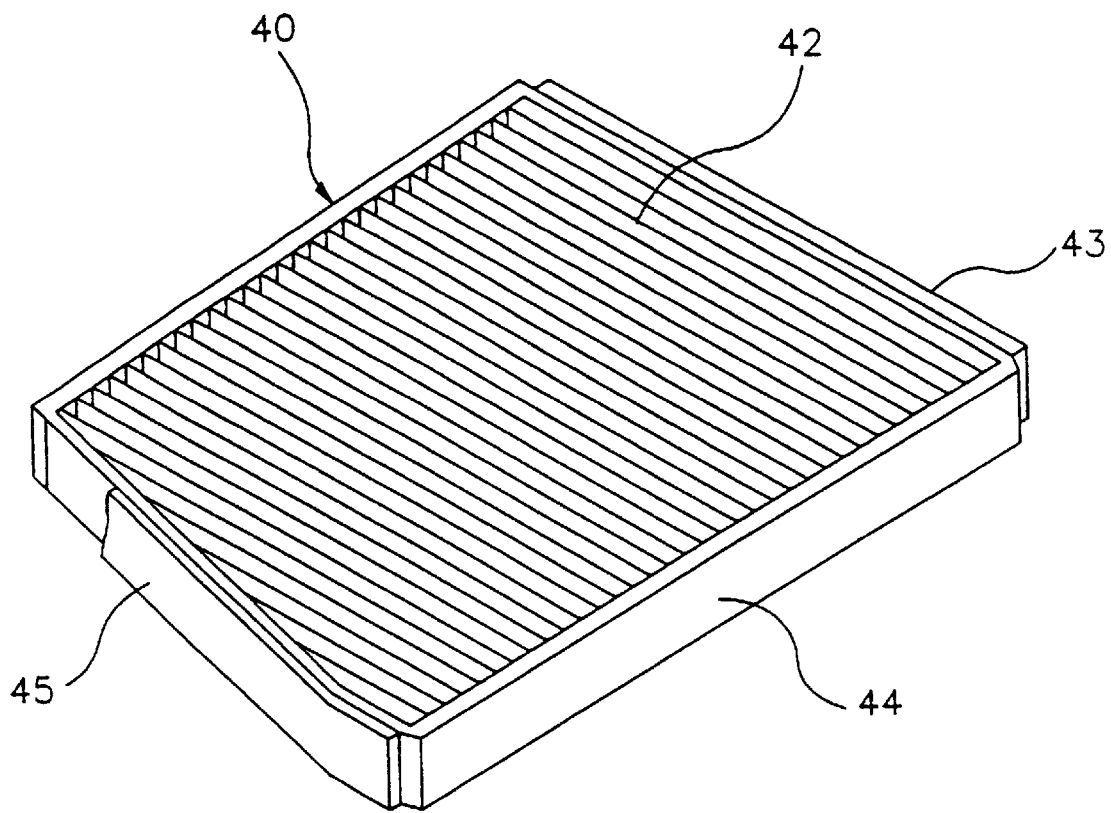
FIG. 5 is a perspective view of the air filter shown in FIG. 4.
Figure 6:
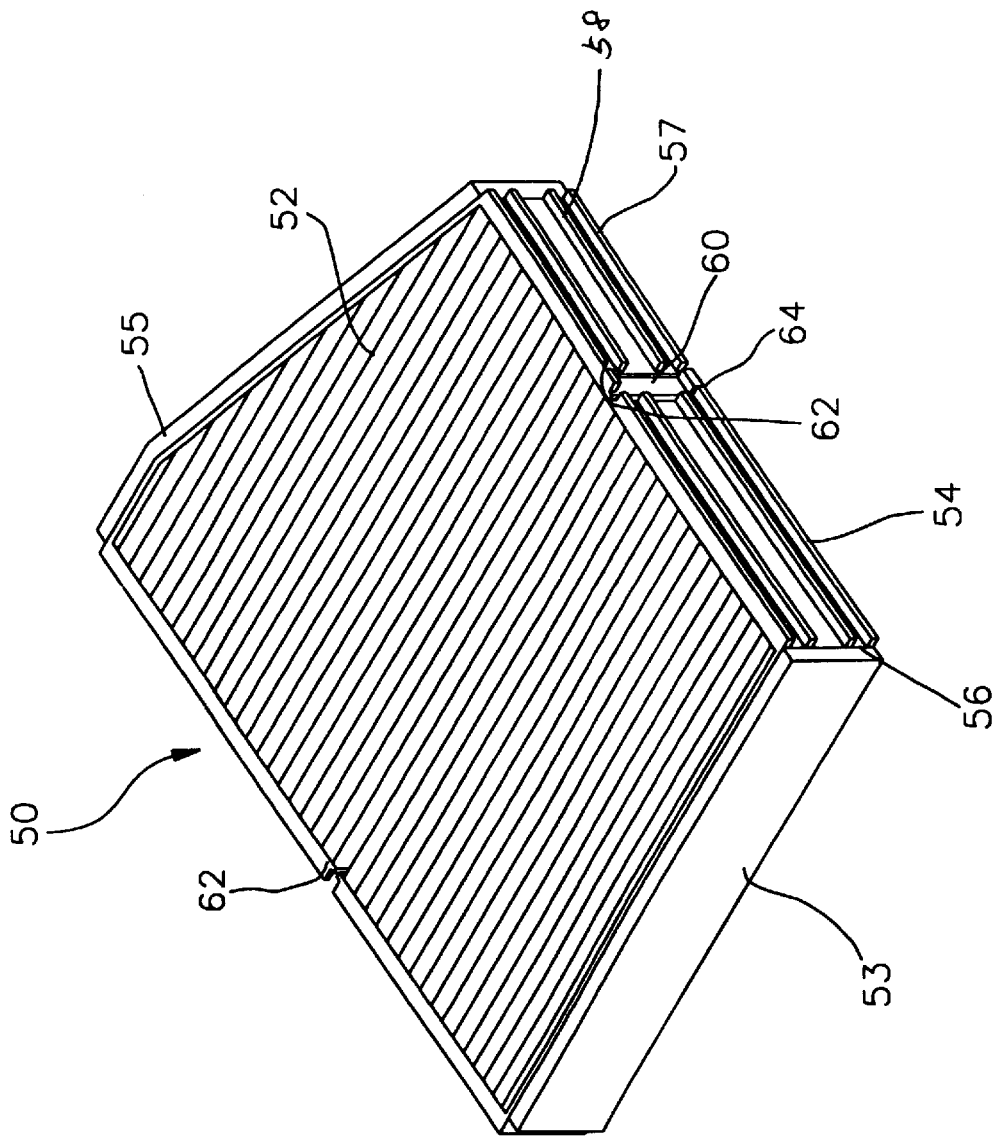
FIG. 6 is a perspective view showing an air filter device according to the present invention.
Figure 7:
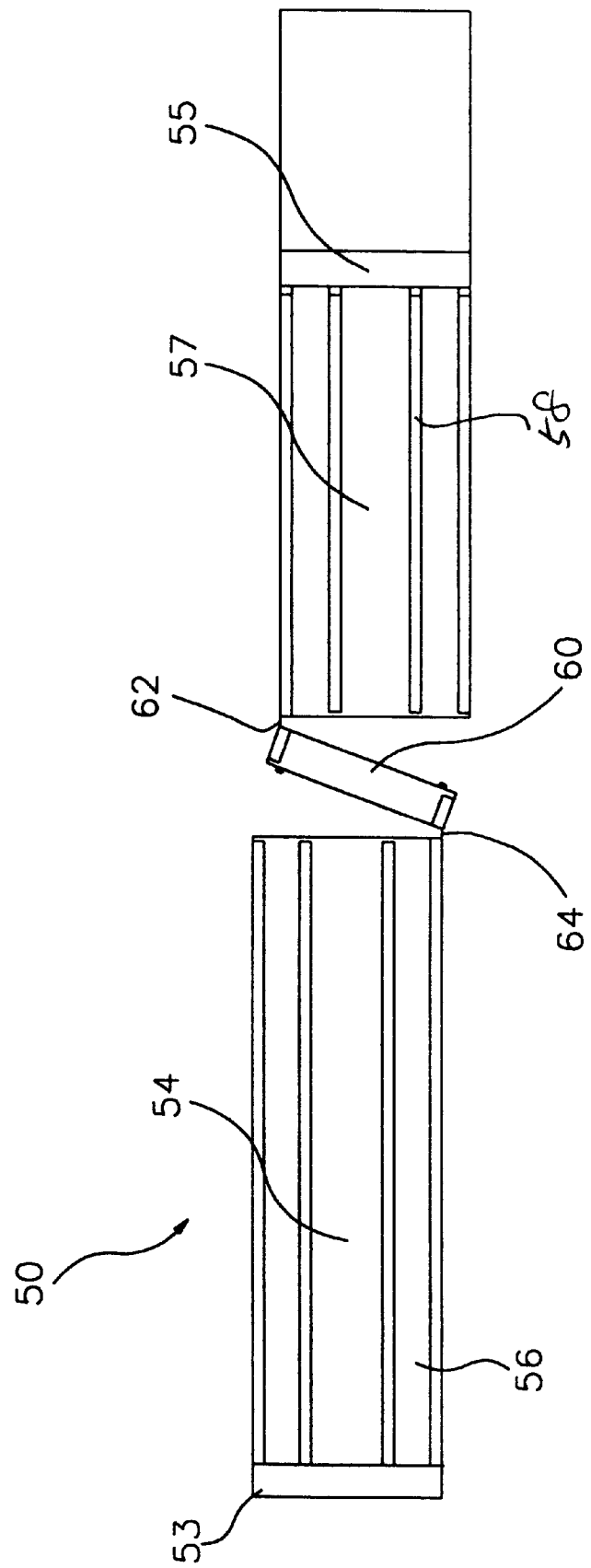
FIG. 7 is a side view of the air filter device shown in FIG. 6.

FIG. 6 is a perspective view showing the air filter device according to the present invention, and FIG. 7 is a side view of the air filter device shown in FIG. 6. As shown in FIGS. 6 and 7, an air filter 50 is largely classified into an air filter member 52, a first frame member 57, a second frame member 54, sponges 53 and 55, etc.

Air filter member 52 is provided with a plurality of alternately-folded creases arranged at equal distances. Air filter member 52 is adhered with first frame member 57, second frame member 54 and a connecting frame member 60 for supporting air filter member 52 along the marginal edge thereof.

First frame member 57 supports one side plane of air filter member 52 and roughly half of both side planes connected to the above side plane, and second frame member 54 supports the remaining half of both side planes and the other side plane. The height of first frame member 57 and second frame member 54 is identical to the height of the creases.

Ribs 58 are respectively formed to side planes of first frame member 57 and second frame member 54 in parallel with the direction of being inserted with air filter 50. Ribs 58 are protrudingly formed by using the direction of being inserted with air filter 50 as the length direction. Ribs 58 numbering four along the width direction of the frame are spaced apart from one another by a predetermined distance to form a guide groove 56 for allowing a bracket (not shown) to be inserted. In particular, ribs 58 are formed to be symmetrical to both sides with respect to a virtual plane which is placed to be high enough to be half of the width height of the frame for the purpose of maintaining the assembling compatibility of air filter 50.

Connecting frame member 60 is disposed between first frame member 57 and second frame member 54. The side plane of connecting frame member 60 is substantially shaped as a rectangle. Connecting frame member 60 has a corner of one end connected to an end of first frame member 57 and a diagonal corner of the other end connected to the end of second frame member 54. The connection between connecting frame member 60 and frame members 57 and 54 is accomplished by integrally injection-molding connecting frame member 60 and frame members 57 and 54.

First notches 62 are formed to the connecting portion between connecting frame member 60 and first frame member 57, and second notches 64 are formed to the connecting portion between connecting frame member 60 and second frame member 54.

Sponge 55 is installed to first frame member 57 where rib 58 is not formed, and sponge 53 is installed to second frame member 54 where rib 58 is not formed. Especially, first frame member 57 and air filter member 52 around the portion of being installed with sponge 55 are asymmetrically shaped so as to efficiently utilize a space within the interior of an engine room.

Figure 8:
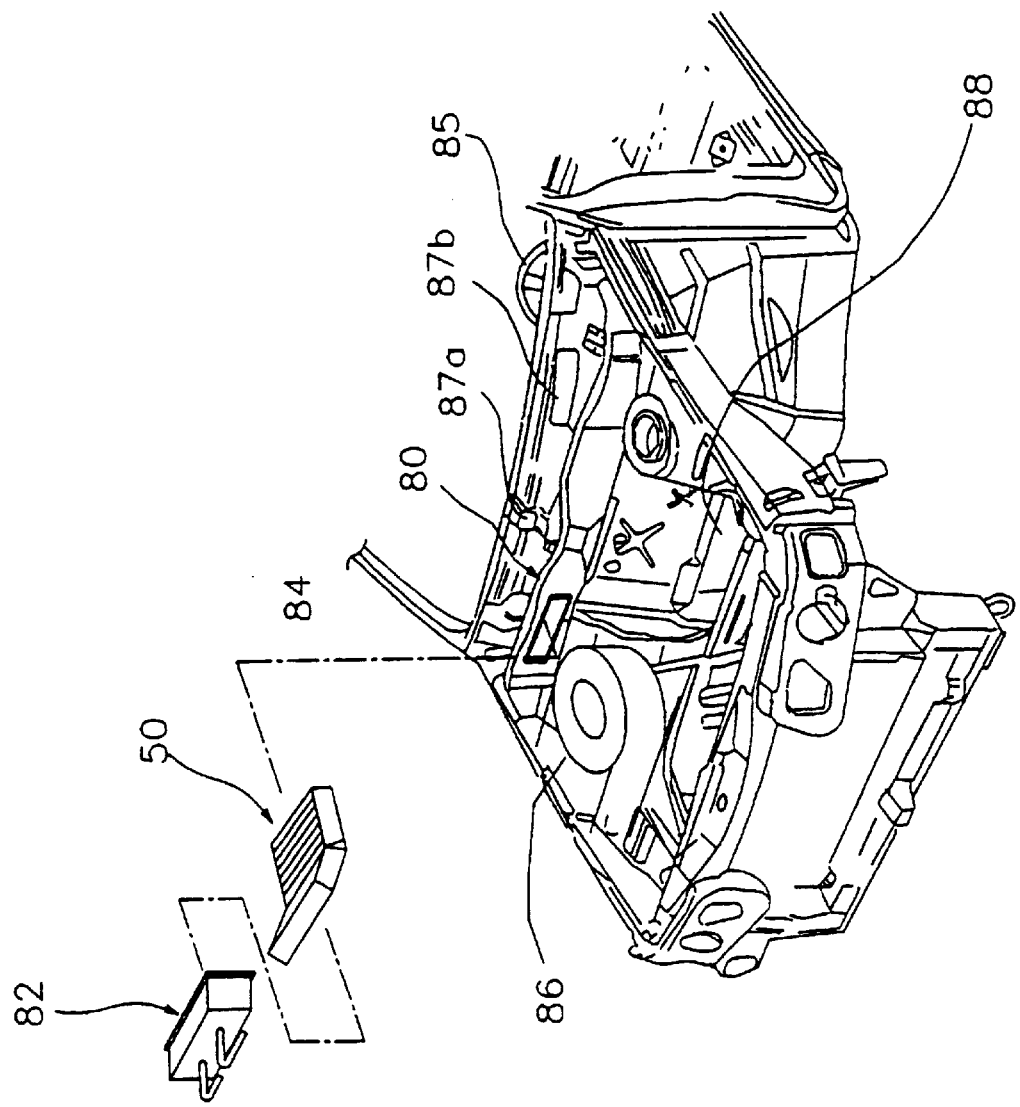
FIG. 8 is an exploded perspective view showing a state that the air filter device shown in FIG. 6 is installed to a left-handed drive type automobile.

FIG. 8 is an exploded perspective view showing a state that the air filter device shown in FIG. 6 is installed to a left-handed drive type automobile. As shown in FIG. 8, an air regulating system 80 for automobile is placed between a left-handed handle 85 and an engine room 88. A pair of holes 87a and 87b are formed in the front of handle 85 for introducing external air.

An shock absorber frame 86 mounted with a shock absorber (not shown) inwardly projects to the interior of engine room 88 in the front diagonal direction of handle 85. A space with a distance shorter than the length of air filter 50 is afforded between shock absorber frame 86 and air regulating system 80. A filter hole 84 is formed in shock absorber frame 86 at a portion corresponding to shock absorber frame 86. Air filter 50 is inserted into filter hole 84, and the entrance is sealed with one side of a vacuum tank 82. Here, vacuum tank 82 performs a separate function independent of air regulating system 80, but is installed to the entrance side of filter hole 84 to serve for tightly closing filter hole 84.

Figure 9:
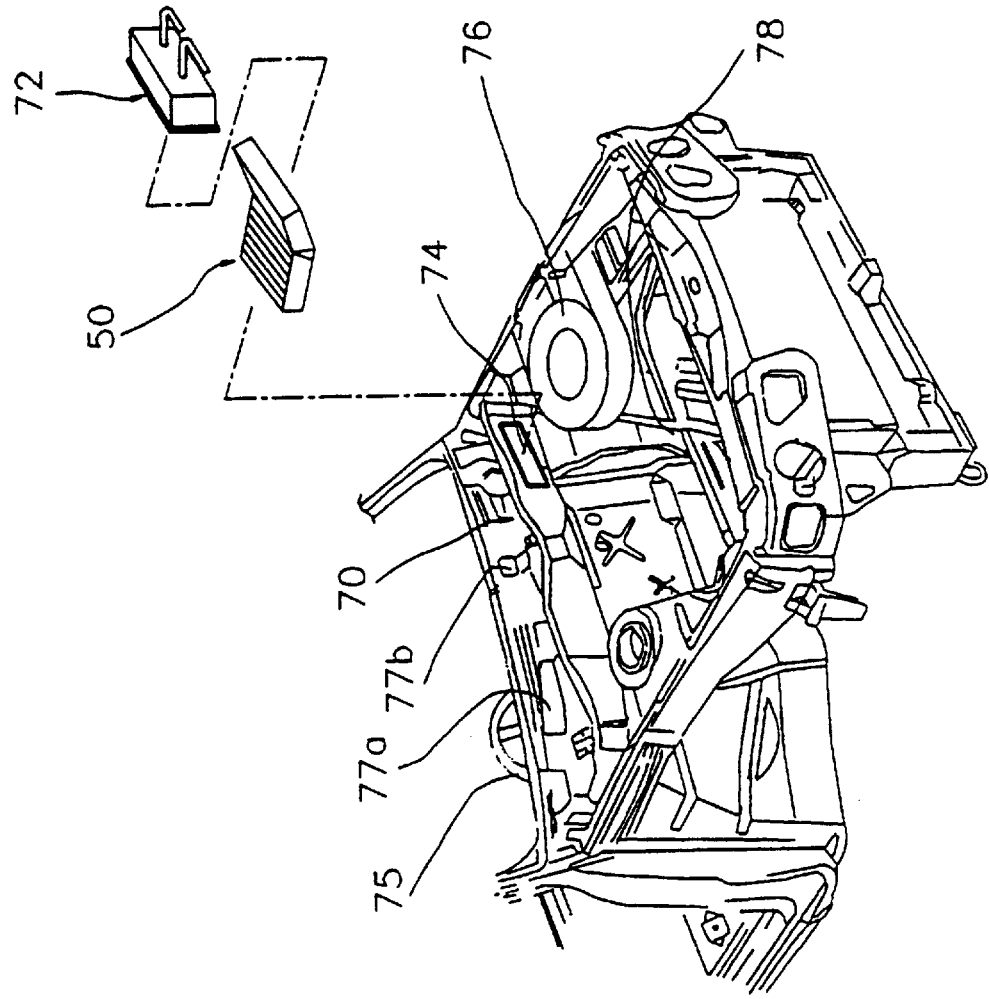
FIG. 9 is an exploded perspective view showing a state that the air filter device shown in FIG. 6 is installed to a right-handed drive type automobile.

FIG. 9 is an exploded perspective view showing a state that the air filter device shown in FIG. 6 is installed to a right-handed drive type automobile. As shown in FIG. 9, an air regulating system 70 for automobile is placed between right-handed handle 75 and an engine room 78. A pair of holes 77a and 77b are formed in the front of handle 75 for introducing external air.

An shock absorber frame 76 mounted with a shock absorber (not shown) inwardly projects to the interior of engine room 78 in the front diagonal direction of handle 85. A space with a distance shorter than the length of air filter 50 is afforded between shock absorber frame 76 and air regulating system 70. A filter hole 74 is formed in shock absorber frame 76 at a portion corresponding to shock absorber frame 86 in air regulating system 70. Air filter 50 is inserted into filter hole 74, and the entrance is sealed with one side of a vacuum tank 72. Here, vacuum tank 72 performs a separate function independent of air regulating system 70, but is installed to the entrance side of filter hole 74 to serve for tightly closing filter hole 74.

The air filter device and the automobile having the same constructed as above is operated as follows.

When the air filter device is intended to be installed to the left-handed drive type automobile, second frame member 54 is upwardly bent with respect to first frame member 57 when using the state shown in FIG. 6 as a reference. Then, the bending is incited at pair of first notches 62 to widen the angle between connecting frame member 60 and first frame member 57. This bending motion simultaneously appears at the creases of air filter member 52 provided to the side of first notches 62. However, since the mutually attached state is maintained unchanged, connecting frame member 60 and second frame member 54 swing in a body.

Under the state that second frame member 54 is bent, first frame member 57 is inserted into filter hole 84 in the horizontal manner. While first frame member 57 is inserted, second frame member 54 having been bent is returned to its original position to force first frame member 57 and second frame member 53 to place in the straight line. Thereafter, second frame member 54 is pushed into the interior of filter hole 84 until sponge 55 is compressed. Upon the completion of the inserting motion, vacuum tank 82 is installed to seal the entrance of filter hole 84. The rear side of vacuum tank 82 seals the entrance of filter hole 84 while being closely attached to sponge 53, and fixes air filter 50.

The air filter device is intended to be installed to the right-handed drive type automobile, second frame member 54 is downwardly bent with respect to first frame member 57 when using the state shown in FIG. 6 as a reference. Then, overall air filter 50 is up side down. By doing so, the bending is incited at pair of second notches 64 to widen the angle between connecting frame member 60 and second frame member 54. This bending motion simultaneously appears at the creases of air filter member 52 at the side of second notches 64. However, the mutually attached state of connecting frame member 60 and first frame member 57 is maintained unchanged.

Under the state that second frame member 54 is bent, first frame member 57 is inserted into filter hole 84 in the horizontal manner. While first frame member 57 is inserted, second frame member 54 having been bent is returned to its original position to force first frame member 57 and second frame member 53 to place in the straight line. Thereafter, second frame member 54 is pushed into the interior of filter hole 84 until sponge 55 is compressed. Upon the completion of the inserting motion, vacuum tank 82 is installed to seal the entrance of filter hole 84. The rear side of vacuum tank 82 seals the entrance of filter hole 84 while being closely attached to sponge 53, and fixes air filter 50.

In association with the air filter device and automobile having the same operated as above, the air filter can be replaced without causing interference with the frame mounted with a shock absorber while a cowl is not disassembled. Thus, the present invention has an advantage of simplifying the exchanging work of the air filter with the consequence of affording convenience that a driver can individually replace the air filter without requesting it to a service center, etc.

Furthermore, in the air filter device and automobile having the same according to the present invention, the second frame member can be upwardly bent without fail even though the upper and lower portions are reversed. This effect provides a compatibility capable of being commonly employed into both the left-handed drive type automobile and right-handed drive type automobile. For this reason, the air filter can be simplified by a single part. As the result, it is effective in economizing the manufacturing cost of the air filter, enhancing productivity, and the like.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An air filter device comprising:

an air filter member that is a single piece formed as a plurality of parallel creases;

a plurality of rigid frame members for containing an edge of said air filter member, said frame members having a pair of first frame members and a pair of second frame members; and a pair of connecting frame members for connecting said frame members to allow for bidirectional bending of said air filter member by being hinged at opposite sides where said plurality of creases extend, each of the connecting frame members having a corner area of one end connected to an end portion of said first frame member and a diagonal corner area of the other end connected to an end portion of said second frame member, and being substantially shaped as a rectangular side plane.

2. The air filter device as claimed in claim 1, wherein said frame member is formed with ribs onto at least one outer plane thereof in the length direction, and said ribs are respectively formed to pair of opposing outer planes of said frame members.

3. The air filter device as claimed in claim 1, wherein each of the connecting frame members is integrally formed with said first frame member, and is formed with first notches at the connecting portion for facilitating a bending motion.

4. The air filter device as claimed in claim 3, wherein each of the connecting frame members is integrally formed with said second frame member, and is formed with second notches at the connecting portion for facilitating a bending motion.

5. An air filter device comprising:

an air filter member formed with a creasing part folded at equal distances throughout overall portion thereof, and having an asymmetric shape with respect to the transversal direction against a bending line of said creasing part;

a pair of frame members for supporting the marginal edge of said air filter member, commonly contacting along the marginal edge of said creasing part of said air filter member, and being formed with ribs at mutually-opposing pair of outer side planes and sponges onto the other pair of outer side planes; and a connecting frame member having a corner area of one end connected to an end portion of said first frame member to allow for bidirectional bending of said air filter member by centering about said creasing part and having a diagonal corner area of the other end integrally connected to an end portion of said second frame member to form a substantially rectangular side plane shape, and being formed with notches at respective connecting porions for facilitating a bending motion.

6. An automobile comprising:

an air filter device having an air filter member which is formed with a creasing part throughout overall area and has an asymmetric shape with respect to the transversal direction against a bending line of said creasing part, a pair of frame members for supporting the marginal edge of said air filter member, and a connecting frame member for allowing for bidirectional bending of said air filter member by centering about said creasing part; and an air regulating system formed with a filter hole inserted with said air filter device, and holes for taking in external air in a portion adjacent to said filter hole.

7. The automobile as claimed in claim 6, wherein said filter hole has an entrance corresponding to the transversal section with respect to the direction of receiving said air filter.

* * * * *